United States Patent [19]
Deckys

[11] Patent Number: 5,769,028
[45] Date of Patent: Jun. 23, 1998

[54] PET CARRIER

[76] Inventor: Jonas E. Deckys, 9220 NE. 141st, Bothell, Wash. 98038

[21] Appl. No.: 660,033

[22] Filed: Jun. 6, 1996

[51] Int. Cl.⁶ ................................................. A01K 1/035
[52] U.S. Cl. .......................... 119/496; 119/473; 119/752; 229/127; 229/23 BT
[58] Field of Search ..................... 119/496, 497, 119/473, 752; 229/23 R, 23 BT, 125.19, 127

[56] References Cited

U.S. PATENT DOCUMENTS

| | | | |
|---|---|---|---|
| 3,272,421 | 9/1966 | Perry | 229/127 X |
| 3,522,904 | 8/1970 | Locke et al. | 119/497 X |
| 3,722,782 | 3/1973 | Collie | 229/126 X |
| 3,910,483 | 10/1975 | Ritter | 229/23 BT |
| 4,010,888 | 3/1977 | Gilbert | 119/497 X |
| 4,105,152 | 8/1978 | Elward | 229/23 BT |
| 4,181,625 | 1/1980 | Stollberg et al. | 229/23 BT |
| 4,367,696 | 1/1983 | Hamann | 119/752 |
| 5,016,753 | 5/1991 | Henderson | 229/23 BT |

*Primary Examiner*—Michael J. Carone
*Assistant Examiner*—Yvonne R. Abbott
*Attorney, Agent, or Firm*—Joan H. Pauly

[57] ABSTRACT

A carrier includes a main unit and an insert unit. The main unit defines a carrying space having a closed bottom and four sides, one of which has an opening therethrough large enough to permit an animal to enter the space through the opening. The insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier. Strength enhancing features include the foldable bottom of the main unit, double and triple thickness portions of the top closure, and the presence of the insert unit in the main unit.

20 Claims, 4 Drawing Sheets

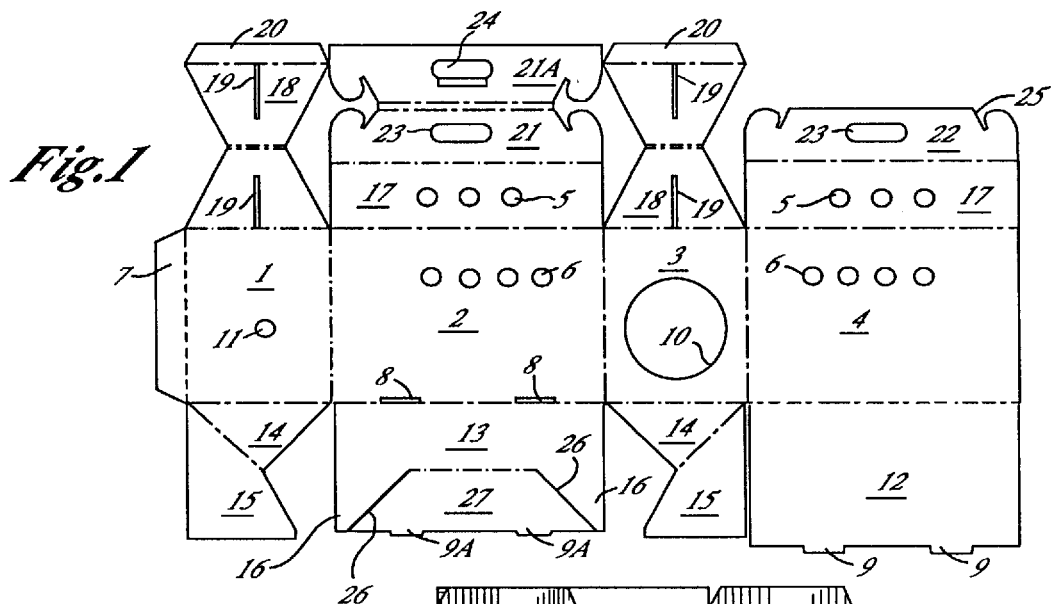
Fig.1
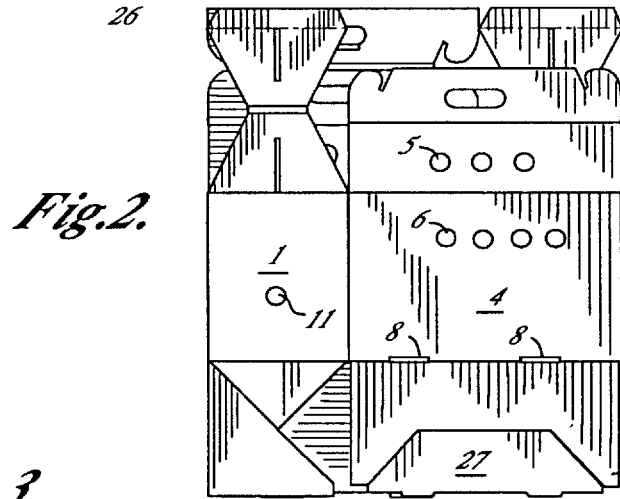
Fig.2
Fig.3
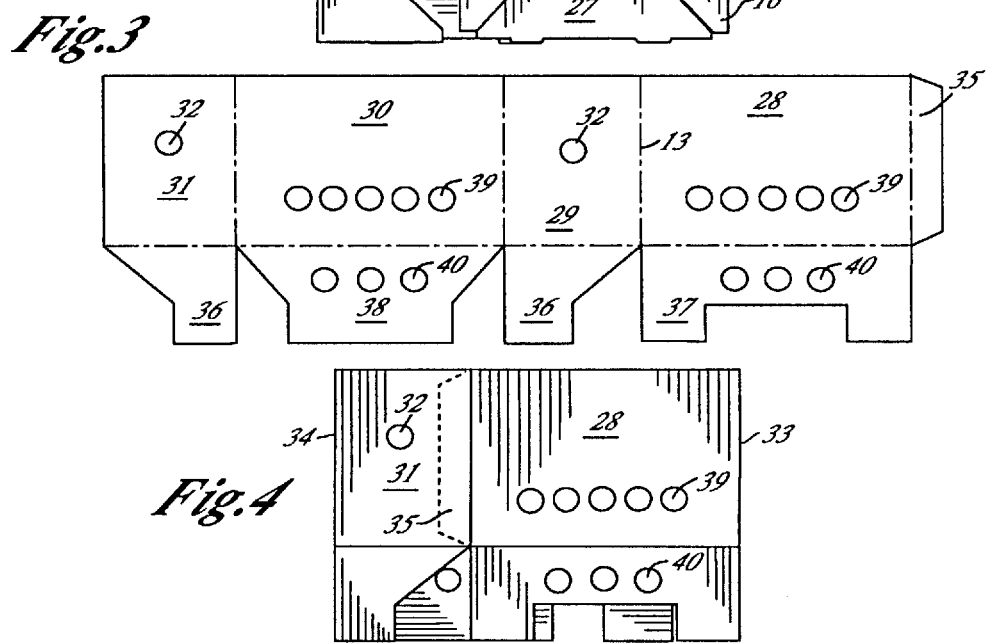
Fig.4

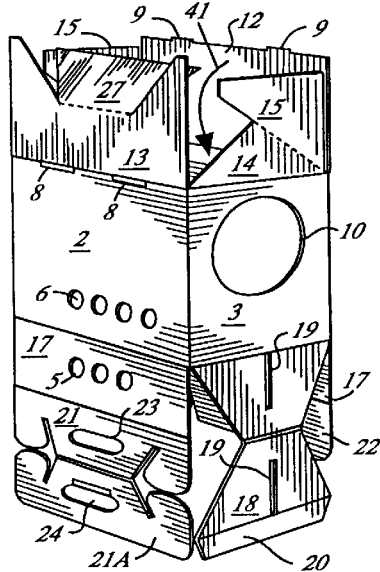
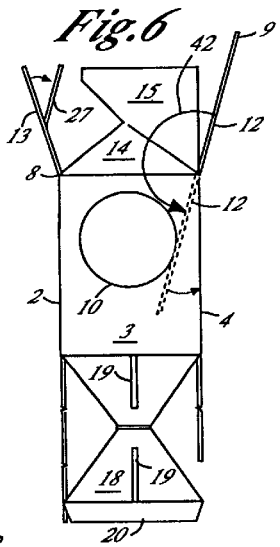
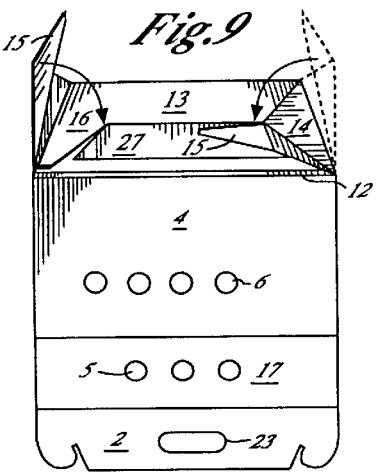
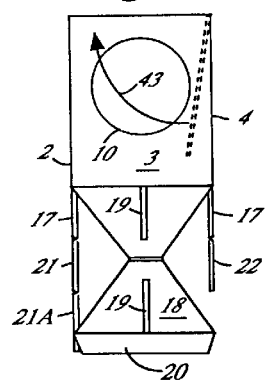
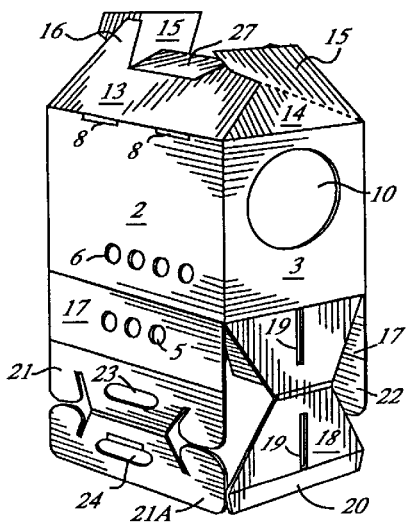
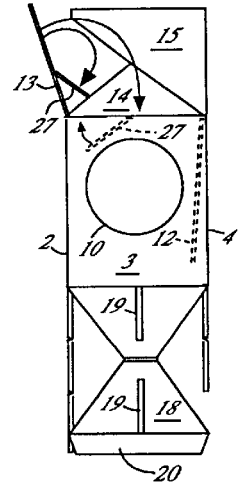
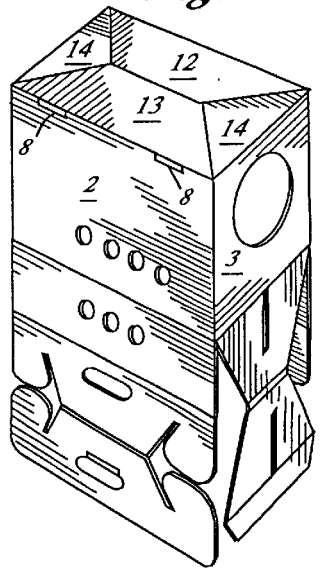

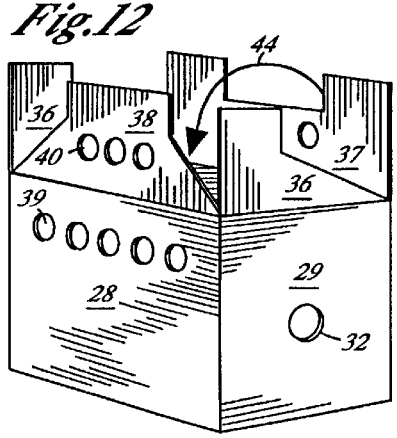
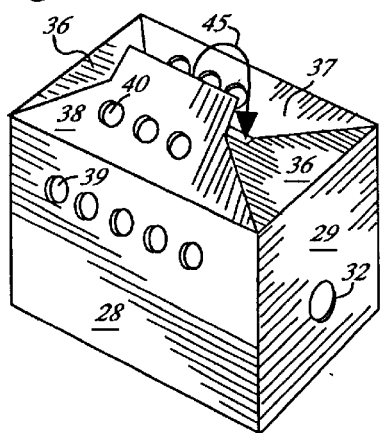
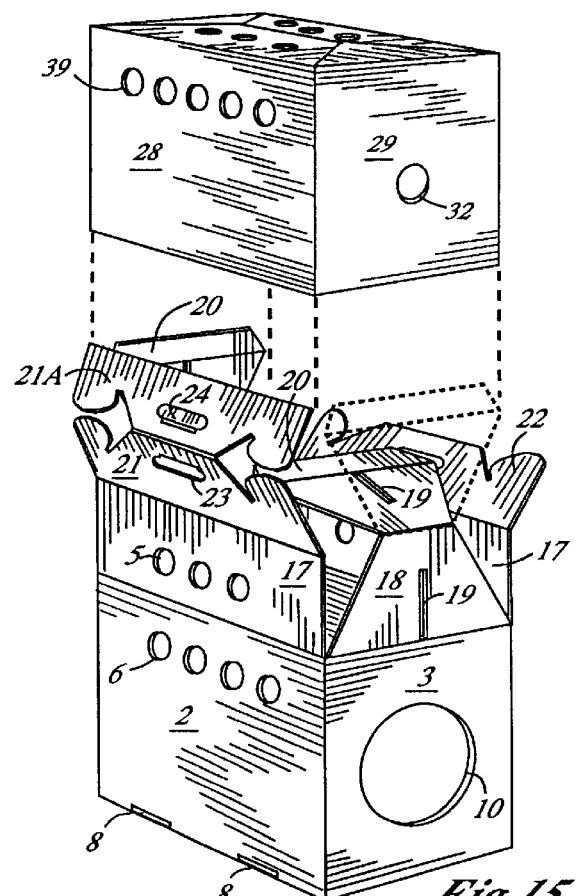
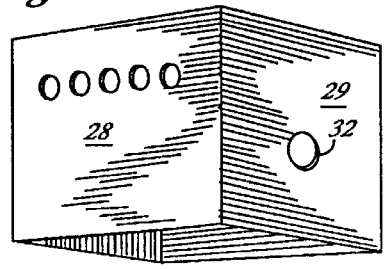
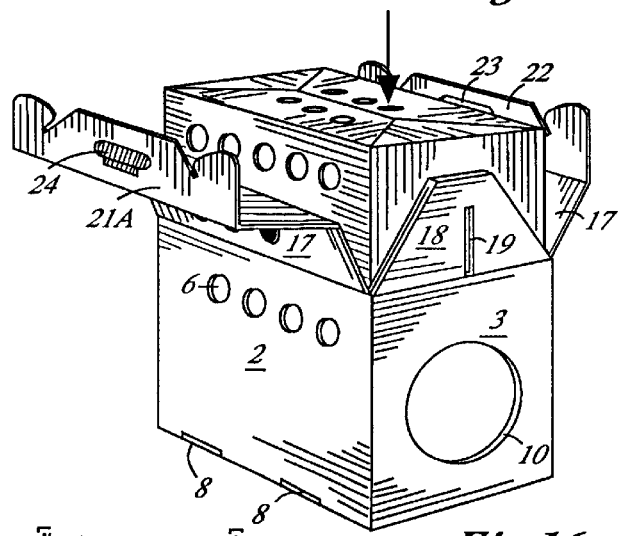
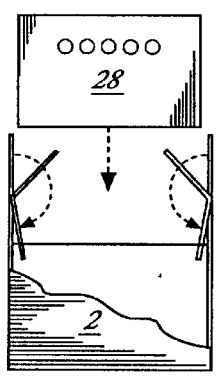
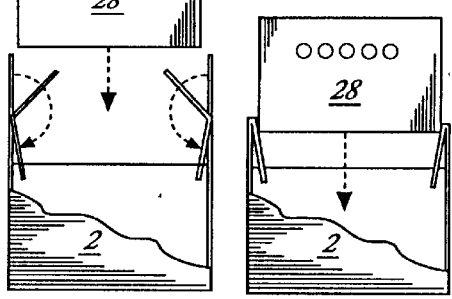
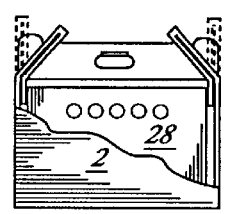

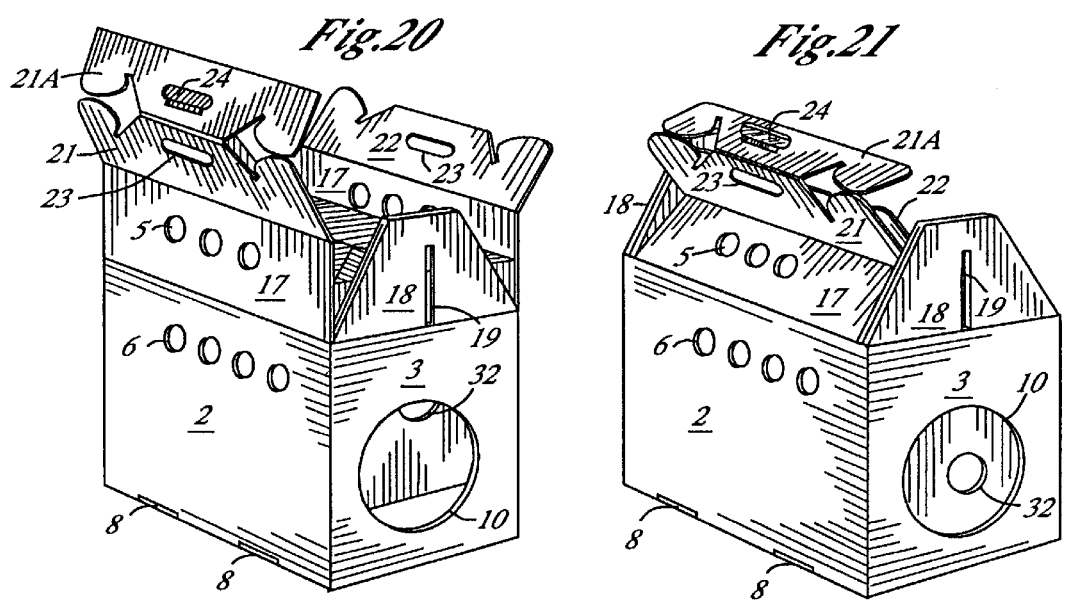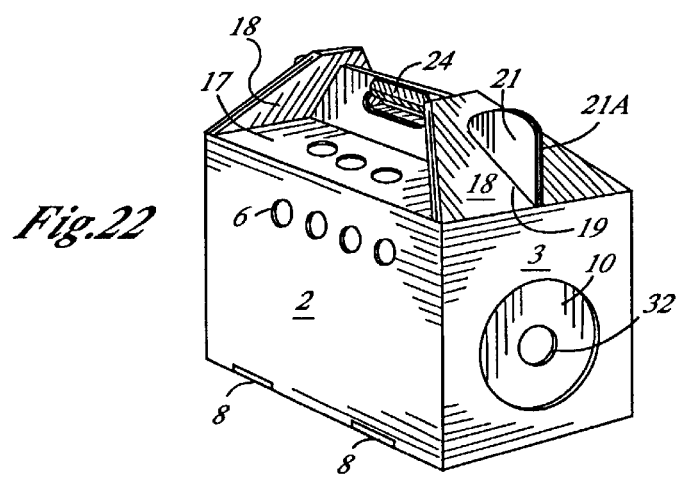

5,769,028

PET CARRIER

TECHNICAL FIELD

This invention relates to foldable paperboard carriers for cats and other small animals, and particularly to a carrier having a telescoping insert box which functions as a trap door, allowing the animal to enter or exit the carrier without prodding or assistance. The structure of the main body of the carrier and the insert box provide the carrier with enhanced strength.

BACKGROUND INFORMATION

The animal carriers that are currently on the market provide only a top opening for placing an animal in the carrier. The animal is placed in the carrier by lowering it into the carrier. Many animals are frightened and reluctant to be placed into a carrier and struggle against the person attempting to place them into the carrier. This makes the use of the carrier unpleasant and difficult for both the animal and the person. In addition, conventional animal carriers that are constructed of corrugated paperboard are relatively weak and have relatively short useful lives. The present invention provides an improved design for corrugated paperboard carriers.

SUMMARY OF THE INVENTION

A subject of the present invention is a carrier for a small animal comprising a main unit and an insert unit. The main unit includes four sides and a bottom defining a carrying space having a top opening. One of the sides has a side opening therethrough large enough to permit the animal to enter the carrying space through the side opening. The insert unit includes four sides, a closed top, and an open bottom. The insert unit is dimensioned to slide down through the top opening of the main unit into a use position in the carrying space and to closely fit inside the main unit in the use position. When the insert unit is in its use position, it at least substantially blocks the side opening.

The insert unit may completely block the side opening. However, preferably one of the sides of the insert unit has an air hole extending therethrough and positioned to align with the side opening when the insert unit is in its use position. The air hole is sufficiently small to prevent the animal from exiting the carrier therethrough.

A preferred feature of the carrier is a main unit that includes an openable closure for the top opening having a plurality of air holes extending therethrough. The top of the insert unit has a plurality of air holes positioned to be aligned with the air holes in the closure when the insert unit is in its use position. Preferably, the air holes in the top of the insert unit are sized to serve as finger holes for pulling the insert unit out of the main unit.

Another subject of the invention is a foldable carrier for a small animal comprising a body having four sides and a bottom defining a carrying space, and an openable top closure for the carrying space. The bottom includes a first panel substantially coextensive with the bottom and foldable along a first bottom edge of a first of the sides into the carrying space. A second panel is foldable toward the first panel along a second bottom edge of a second of the sides opposite the first side. The second panel has a pair of spaced apart wing opposite the second bottom edge. Opposite side panels are foldable toward the second panel along bottom edges of the sides substantially perpendicular to the first and second bottom edges. Each side panel has a main portion that folds over a bottom surface of a respective one of the wings, and a flap portion that folds around the respective wing into a position adjacent to a top surface of the respective wing to secure the second panel in a use position.

Preferably, the body has a slot extending therethrough along the second bottom edge. The first panel has a projecting tab positioned to engage the slot to hold the first panel in a use position substantially abutting the second panel and the flap portions of the side panels.

Another preferred feature is a second panel that is formed from a blank substantially coextensive with the first panel and having spaced apart slits defining inner edges of the wings. An intermediate portion between the slits is folded back against the upper surface of the second panel to permit the flap portions to be folded around the wings. Preferably, when the flap portions are folded around the wings, the flap portions extend toward each other beyond the wings along an upwardly facing surface of the second panel.

The preferred embodiment of the carrier of the invention includes both the insert unit and the foldable bottom structure described above. This combination of features enhances the strength of the carrier. The combination of the insert unit and the side opening provides a means for allowing the animal to enter or exit the carrier without assistance or prodding. This procedure avoids frightening the animal and the necessity of struggling with the animal to place it in the carrier.

BRIEF DESCRIPTION OF THE DRAWINGS

In the drawings, like element designations refer to like parts throughout, and:

FIG. 1 is a plan view of the one-piece main body or unit of the carrier flattened in a completely unfolded position.

FIG. 2 is a plan view of the main unit shown in FIG. 1 after the two free edges have been adhesively secured together and the unit has been moved into a flattened but otherwise unfolded storage position.

FIG. 3 is like FIG. 1 except that it shows the insert unit.

FIG. 4 is like FIG. 2 except that it shows the insert unit.

FIG. 5 is a pictorial view of the adhesively secured main unit shown in FIG. 2 opened up into a rectangular configuration and ready to be folded into its use configuration.

FIGS. 6–11 illustrate the folding of the bottom of the main unit shown in FIG. 5 into its use position shown in FIG. 11. FIGS. 7, 9, and 11 are pictorial views, and FIGS. 6, 8, and 10 are elevational views.

FIGS. 12–14 are pictorial views illustrating the folding of the insert unit into its use configuration shown in FIG. 14.

FIG. 15 is a pictorial view illustrating the folding of the sides of the top closure of the main unit and the insert unit in position above the main unit ready to be lowered down into the main unit.

FIG. 16 is a pictorial view illustrating the lowering of the insert unit down into the main unit.

FIGS. 17 and 18 are elevational views illustrating the procedures shown in FIGS. 15 and 16, with foreground portions of the main unit cut away.

FIG. 19 is an elevational view similar to FIGS. 17 and 18 but showing the insert unit in place within the carrying space and the closure sides being moved into lock position.

FIGS. 20–22 are pictorial views illustrating the insert unit nearing its use position inside the carrying space and the securing of the top closure of the main unit.

BEST MODE FOR CARRYING OUT THE INVENTION

The drawings show a carrier for a small animal that is constructed according to the invention and that constitutes the best mode for carrying out the invention currently known to the applicant. As shown in the drawings, the carrier includes a main unit, shown in FIGS. 1, 2, 5–11, and 15–22, and an insert unit shown in FIGS. 3, 4, and 12–14. Both of the units are preferably made from corrugated paperboard.

The main unit, in its use configuration shown in FIGS. 15–22 forms a rectangular box. Referring to FIG. 1, the rectangular box is made by folding a die cut corrugated paperboard blank. The fold lines are indicated by broken lines in FIG. 1. The main unit has four sides, including two large sides 2, 4 and two smaller sides or ends 1, 3. An end tab 7 is formed on the outer edge of one of the smaller sides 1. In the manufacture of the carrier, the end tab 7 is glued to the inner surface of the panel 4 adjacent the free edge of the panel 4 to form the continuous perimeter of the main unit, as shown in FIG. 2. Two spaced-apart slots 8 extend through the side 2 along the lower edge of the side 2. Corresponding tabs 9, 9A are formed on the free ends of a first bottom panel 12 and a second bottom panel 13 and are positioned to be engaged in the slots 8 when the main unit is folded for use. A large side opening 10 is formed in the side 3 and is dimensioned to be large enough to permit an animal to enter the carrier and the carrying space defined thereby through the side opening 10. A plurality of air holes 6 are provided in each of the larger sides 2, 4. An air hole 11 is provided in smaller side 1.

The bottom of the main unit has a strong structure that is an important feature of the invention. The bottom includes the first panel 12, which extends from the bottom edge of the side 4 and is substantially coextensive with the bottom. In the use configuration of the carrier, the four sides 1, 2, 3, and 4 and the bottom define the carrying space for the animal. The panel 12 serves as the floor of the carrying space and supports the animal. The second panel 13 extends from the bottom edge of the side 2 and has a pair of spaced apart wings 16 opposite this bottom edge. In the blank shown in FIG. 1, the second panel 13 is substantially coextensive with the first panel 12. The second panel 13 has a pair of spaced apart slits 26 defining the inner edges of the wings 16 and separating the wings 16 from an intermediate portion 27. In addition to the first panel 12 and the second panel 13, the bottom includes two side or end panels 14, 15. Each of the end panels includes a main portion 14 that extends from the bottom edge of one of the smaller sides 1, 3 and a flap portion 15 extending from the main portion 14.

The carrying space of the main unit has a top opening. The main unit also includes an openable closure for this top opening. The closure includes two main panels 17, 21, 21A and 17, 22. These panels extend, respectively, from the top edges of the sides 2, 4. The closure also includes securing panels 18 extending from the top edges of the smaller sides 1, 3. Each securing panel 18 has a pair of slots 19 positioned to align with each other when the securing panel 18 is folded along its narrow waist to provide the securing panel 18 with a double thickness. An extension 20 extends from the outer edge of the securing panel 18.

The first main closure panel 17, 21, 21A includes a cover portion 17 and two handle portions 21, 21A. The second main closure panel 17, 22 includes a cover portion 17 and a single handle portion 22. Each of the handle portions 21, 21A, 22 is provided with a grip opening 23. In the handle portions 21, 22, the blank is cut all the way around the grip openings 23 and the paperboard material is removed therefrom. In the handle portion 21A, the blank is cut only partially around the grip opening 23 to leave a lock tab 24. In addition to the grip openings 23, each of the handle portions is provided with a pair of opposite notches 25. The cover portions 17 are provided with a plurality of air holes 5.

In its use configuration shown in FIGS. 14–16, the insert unit forms a five-sided box with an open bottom. The box includes two larger sides 28, 30 having air holes 39 and two smaller sides or ends 29, 31 each having a single air hole 32.

Referring to FIG. 3, the free end of side 28 has an end tab 35 which is glued to the inner surface of the side 31 to form a continuous perimeter of the insert unit, as indicated in FIG. 4. The top of the insert unit is formed from opposite top end panels 36, a first top side panel 37, and a second top side panel 38. Air holes 40 are formed in the first and second top side panels 37, 38.

Both the main unit and the insert unit are storable, an are preferably sold, in the flattened configurations shown in FIGS. 2 and 4. In these configurations, the fold lines are shown in solid lines since they have been prefolded by the manufacturer to facilitate the assembly of the carrier by the user. FIGS. 5–22 illustrate the folding of the units into their use configurations.

FIGS. 5–11 show the main unit upside down and illustrate the folding of the main unit. FIG. 5 shows the main unit after the four sides have been moved from their flattened positions shown in FIG. 2 into the use position in which they form the perimeter of a rectangular box. In this configuration, the larger sides 2, 4 and their bottom edges are opposite each other and the smaller sides 1, 3 are at least substantially perpendicular to the sides 2, 4. Once the unit has been opened up, the bottom elements are folded as shown in FIGS. 6–11. FIGS. 5 and 6 illustrate the folding of the first bottom panel 12 in the direction indicated by the arrows 41, 42 in FIGS. 5 and 6, respectively. Panel 12 is folded along its connection with side 4, which is the bottom edge of side 4, and down into the carrying space toward the inner surface of the side 4. Then, the intermediate portion 27 of the second panel 13 is folded back against the main portion of the panel 13, and the panel 13 is folded along the bottom edge of the side 2 toward the first panel 12, as shown in FIGS. 7 and 8. The panel 13 is folded into a horizontal position in which the tabs 9A are received in the slots 8.

Referring to FIG. 9, once the second panel 13 has been folded down into a horizontal position, the two opposite side bottom panels 14, 15 are folded down over the bottom surfaces of the wings 16. The flap portion 15 of each side bottom panel 14, 15 is folded around the respective wing 16 and into a position in which it is adjacent to a top surface of the wing 16 to secure the second panel 13 in its use position, shown in FIG. 11. The flap portions 15 are preferably sized so that, when they are folded around the wings 16, they extend toward each other beyond the wings 16 along an upwardly facing surface of the second panel 13. In the case of the illustrated embodiment, this upwardly facing surface is the adjacent surface of the intermediate portion 27.

When the side bottom panels 14, 15 have been folded into position, the user reaches into the carrying space through the still open top closure and pushes the first panel 12 in the direction shown by the arrow 43 in FIG. 10. The panel 12 is pushed into a position in which the tabs 9 are received in the slots 8 to secure the panel 12 in its use position. In this position, the first panel 12 substantially abuts the second panel 13 and the folded flap portions 15 of the side bottom panels 14, 15. The result is an extremely sturdy bottom structure that will easily support even a relatively heavy animal placed in the carrier.

The engagement of the tabs 9A in the slots 8 contributes to the strength of the bottom structure by helping to hold the second panel 13 and its intermediate portion 27 in position. However, the tabs 9A may be omitted without substantially affecting the strength. The first panel 12 and the end panels 14, 15 folded around the second panel 13 also serve to hold the second panel 13 and portion 27 in position.

FIGS. 12 and 13 illustrate the folding of the insert, unit into its use configuration. As with the main unit, the insert unit is first pulled out of its flattened storage configuration into the rectangular configuration shown in FIG. 12. Then, the top panels are folded into position. The first top side panel 37 is folded first, as indicated by the arrow 44 in FIG. 12. Then the top end panels 36 are folded down over the first panel 37. Finally, the second top side panel 38 is folded down and the tab on its projecting end is pushed under the free end of the first panel 37, as indicated by the arrow 45 in FIG. 13. This completes the assembly of the insert unit.

FIGS. 15–18 illustrate the lowering of the insert unit down through the open top closure of the main unit into the carrying space defined by the main unit. Before the insert unit is lowered, each securing panel 18 is folded along its narrow waist and the free end of the panel 18 is folded down so that the extension 20 extends down into the carrying space, as shown in FIGS. 17–19. The units are sized so that the insert unit slides down into the main unit without difficulty but fits closely inside the main unit to maximize the available carrying space and the strengthening effect of the insert unit. The close fit also causes the insert unit to engage the extensions 20 to maintain the folded position of the securing panels 18, as shown in FIG. 19.

When the insert unit is in the partially lowered position shown in FIG. 16, the animal may be invited to enter the carrier. Many small animals, and especially cats, will enter the carrier without coaxing. If there is some reluctance on the part of the animal, the animal can be enticed by placing a treat inside the carrying space. While the animal is deciding whether to enter and is entering the carrier, there is no need for anyone to hold the insert unit in place since the snug engagement of the insert unit by the extensions 20 holds the insert unit in the partially lowered position. After the animal has entered the carrying space, the insert unit is simply pushed all the way down into the carrying space to block the side opening 10 in the main unit and prevent the animal from exiting. The air holes 6, 39 in the larger sides of the units align with each other. The air holes 32 in the smaller sides of the insert unit align with the air hole 11 and the side opening 10 in the main unit. Either of the air holes 32 may be aligned with the side opening 10.

Once the insert unit is in position, the top closure of the main unit is secured to secure the insert unit in place and assemble the carrying handle portions of the carrier.

Referring to FIGS. 20–22, the first and second main closure panels 17, 21, 21A and 17, 22 are folded down over the top of the insert unit. At the same time, the handle portions 21, 21A, 22 are folded upwardly. The result is that the cover portions 17 are substantially coextensive with and cover the top of the insert unit, and the handle portions extend upwardly from the adjacent edges of the cover portions 17. Air holes 5 align with air holes 40. Handle portion 22 abuts handle portion 21. The extra handle portion 21A is folded down over the opposite surface of the handle portion 22 so that handle portion 22 is sandwiched between handle portions 21L, 21A. Then, the lock tab 24 is pushed through the grip openings 23 in the three handle portions to secure the handle portions together. Finally, the two opposite securing panels 18 are folded down over the handle 21, 21A, 22 with the edges of the handle being received into the slots 19. The notches 25 engage the ends of the slots 19 to lock the top closure in its secured use position shown in FIG. 22.

Lifting the carrier by the handle further secures the engagement of the slot ends in the notches 25. The double and triple thicknesses of the panels 18 and the handle 21, 21A, 22 provide a strong and durable handle and reliable locking of the top closure.

After the carrier has been taken to its destination, the animal may be removed from the carrier by opening the top closure and lifting the insert unit into the position shown in FIG. 16 to allow the animal to exit under its own power. The opening of the top closure is accomplished by reversing the procedure for closing the top closure. If the animal would rather remain in the carrier, the insert unit can be completely removed from the main unit and the animal lifted out. Preferably, the air holes 40 in the top of the insert unit are sized to serve as finger holes to facilitate the lifting of the insert upwardly relative to the main unit.

The carrier may be stored in the assembled configuration shown in FIG. 22. However, in most cases, it is preferable to return the carrier units to the flattened configurations shown in FIGS. 2 and 4 to conserve storage space. The insert unit may be flattened by pulling the second top panel 38, then the top end panels 36, and then the first top panel 37 upwardly into positions parallel to the sides 30, 29, 31, 28, and pushing the sides together. Pulling the second panel 38 can be facilitated by engaging the finger holes 40. Disassembling the bottom of the main unit is accomplished by pushing inwardly on the first bottom panel 12 to disengage the tabs 9 from the slots 8 and pivot the panel 12 into the carrying space. Then, the bottom end panels 14, 15 are unfolded away from the second bottom panel 13, the second bottom panel 13 is unfolded, and the unit is flattened. A finger hole (not shown) may be provided in the main portion of the second panel 13 to facilitate disengagement of the tabs 9, 9A from the slots 8.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A cat carrier comprising:

a main unit including four sides and a bottom defining a carrying space having a top opening, one of said sides having a side opening therethrough large enough to permit a cat to enter said space through said side opening; and an insert unit including four sides, a closed top, and an open bottom; said insert unit being dimensioned to slide down through said top opening into a use position in said space and to closely fit inside said main unit in said use position, and said insert unit at least substantially blocking said side opening when said insert unit is in said use position to block egress of the cat from said space; and said insert unit having a raised position in which it is partially received in said space with a lower portion of each said side of said insert unit closely adjacent to an inner surface of a corresponding side of said main unit and with at least said lower portion corresponding to said one of said sides of said main unit above said side opening, to cooperate with said main unit to block entry and egress of the animal into and from said space except through said side opening.

2. The carrier of claim 1, wherein one of said sides of said insert unit has an air hole extending therethrough and positioned to align with said side opening when said insert unit is in said use position, said air hole being sufficiently small to prevent the animal from exiting the cat carrier therethrough.

3. The carrier of claim 2, in which said main unit includes an openable closure for the top opening having a plurality of air holes extending therethrough, and said top of said insert unit has a plurality of air holes positioned to be aligned with said air holes in said closure when said insert unit is in said use position.

4. The carrier of claim 1, in which said main unit includes an openable closure for the top opening having a plurality of air holes extending therethrough, and said top of said insert unit has a plurality of air holes positioned to be aligned with said air holes in said closure when said insert unit is in said use position.

5. The carrier of claim 4, in which said air holes in said top of said insert unit are sized to serve as finger holes for pulling said insert unit out of said main unit.

6. The carrier of claim 1, in which said bottom of said main unit includes a first panel substantially coextensive with said bottom and foldable along a first bottom edge of a first of said sides of said main unit into said space, a second panel foldable toward said first panel along a second bottom edge of a second of said sides of said main unit opposite said first side and having a pair of spaced apart wings opposite said second bottom edge, and opposite side panels foldable toward said second panel along bottom edges of said sides of said main unit substantially perpendicular to said first and second bottom edges; each said side panel having a main portion that folds over a bottom surface of a respective one of said wings, and a flap portion that folds around the respective wing into a position adjacent to a top surface of the respective wing to secure said second panel in a use position.

7. The carrier of claim 1, wherein said side opening is at least substantially circular.

8. A foldable carrier for a small animal comprising a body having four sides and a bottom defining a carrying space, and an openable top closure for said space; said bottom including a first panel substantially coextensive with said bottom and foldable along a first bottom edge of a first of said sides into said space, a second panel foldable toward said first panel along a second bottom edge of a second of said sides opposite said first side and having a pair of spaced apart wings opposite said second bottom edge, and opposite side panels foldable toward said second panel along bottom edges of said sides substantially perpendicular to said first and second bottom edges; each said side panel having a main portion that folds over a bottom surface of a respective one of said wings, and a flap portion that folds around the respective wing into a position adjacent to a top surface of the respective wing to secure said second panel in a use position.

9. The carrier of claim 8, wherein said body has a slot extending therethrough along said second bottom edge, and said first panel has a projecting tab positioned to engage said slot to hold said first panel in a use position substantially abutting said second panel and said flap portions.

10. The carrier of claim 8, wherein said second panel is formed from a blank substantially coextensive with said first panel and having spaced apart slits defining inner edges of said wings, and an intermediate portion therebetween folded back against the upper surface of said second panel to permit said flap portions to be folded around said wings.

11. The carrier of claim 10, wherein, when said flap portions are folded around said wings, said flap portions extend toward each other beyond said wings along an upwardly facing surface of said second panel.

12. The carrier of claim 8, wherein, when said flap portions are folded around said wings, said flap portions extend toward each other beyond said wings along an upwardly facing surface of said second panel.

13. A cat carrier comprising:
a main unit including four sides having a substantially uniform height and a bottom, said sides and said bottom defining a carrying space having a top opening, and one of said sides having a side opening therethrough large enough to permit a cat to enter said space through said side opening; and
an insert unit including four sides, a closed top, and an open bottom; said insert unit being dimensioned to slide down through said top opening into a use position in said space and to closely fit inside said main unit in said use position, and said insert unit at least substantially blocking said side opening when said insert unit is in said use position.

14. The carrier of claim 13, wherein said insert unit is repeatedly slidable into and out from said use position to permit repeated use of the carrier to temporarily confine a cat.

15. The carrier of claim 13, wherein one of said sides of said insert unit has an air hole extending therethrough and positioned to align with said side opening when said insert unit is in said use position, said air hole being sufficiently small to prevent a cat from exiting the carrier therethrough.

16. The carrier of claim 15, in which said main unit includes an openable closure for the top opening having a plurality of air holes extending therethrough, and said top of said insert unit has a plurality of air holes positioned to be aligned with said air holes in said closure when said insert unit is in said use position.

17. The carrier of claim 13, in which said main unit includes an openable closure for the top opening having a plurality of air holes extending therethrough, and said top of said insert unit has a plurality of air holes positioned to be aligned with said air holes in said closure when said insert unit is in said use position.

18. The carrier of claim 17, in which said air holes in said top of said insert unit are sized to serve as finger holes for pulling said insert unit out of said main unit.

19. The carrier of claim 13, in which said bottom of said main unit includes a first panel substantially coextensive with said bottom and foldable along a first bottom edge of a first of said sides of said main unit into said space, a second panel foldable toward said first panel along a second bottom edge of a second of said sides of said main unit opposite said first side and having a pair of spaced apart wings opposite said second bottom edge, and opposite side panels foldable toward said second panel along bottom edges of said sides of said main unit substantially perpendicular to said first and second bottom edges; each said side panel having a main portion that folds over a bottom surface of a respective one of said wings, and a flap portion that folds around the respective wing into a position adjacent to a top surface of the respective wing to secure said second panel in a use position.

20. The carrier of claim 13, wherein said side opening is at least substantially circular.

* * * * *

UNITED STATES PATENT AND TRADEMARK OFFICE
CERTIFICATE OF CORRECTION

PATENT NO: 5,769,028

DATED: June 23 1998

INVENTOR(S): Jonas E. Deckys

It is certified that error appears in the above-identified patent and that said Letters Patent is hereby corrected as shown below:

Column 1, line 64, "wing" should be --wings --.

Column 4, line 12, "an" should be -- and --.

Column 5, line 4, delete ",".

Column 5, line 61, "21L" should be -- 21 --.

Claim 1, column 6, line 63, "animal" should be -- cat --.

Claim 2, column 7, line 3, "animal" should be -- cat --.

Signed and Sealed this

Twelfth Day of January, 1999

Attest:

Attesting Officer

*Acting Commissioner of Patents and Trademarks*